June 3, 1969

R. L. LICH 3,447,483

RESILIENTLY CENTERED RAILWAY LOCOMOTIVE TRUCK

Filed Aug. 10, 1967

INVENTOR:
RICHARD L. LICH
BY Bedell & Burgess
ATTORNEYS.

United States Patent Office 3,447,483
Patented June 3, 1969

---

3,447,483
RESILIENTLY CENTERED RAILWAY LOCOMOTIVE TRUCK
Richard L. Lich, St. Louis County, Mo., assignor to General Steel Industries, Inc., Granite City, Ill., a corporation of Delaware
Filed Aug. 10, 1967, Ser. No. 659,723
Int. Cl. B61f 5/06, 5/16
U.S. Cl. 105—136                                13 Claims

---

ABSTRACT OF THE DISCLOSURE

A railway truck having three axles, a rigid frame mounted thereon, rubber pads seated on said frame at opposite sides thereof and intermediate the middle axle and the end axles, a bolster seated on said pads for vertical movement and limited movement solely in a direction transverse of the frame, upwardly facing bearing surfaces on said bolster and spaced apart longitudinally and transversely thereof, said bearing surfaces adapted to slidably engage bearings rigidly depending from a supported underframe, said bolster having at its center an aperture elongated lengthwise of the truck to receive a cylindrical element depending from the underframe for pivotal movement and for sliding movement lengthwise of the truck, said bolster aperture being of sufficient height to clear a middle axle motor, said frame having an aperture at axle level elongated transversely of the truck and disposed between the middle axle and an end axle, said frame aperture being adapted to receive a second cylindrical element rigidly depending from the underframe for pivotal movement and for sliding movement transversely of the truck only whereby to transmit longitudinal forces from said truck frame to the underframe at a level substantially lower than the bolster at axle level and thus reduce load transference between the axles.

---

Field of the invention

The invention relates to railway rolling stock and consists particularly in a three axle electric motor truck for locomotives in which the locomotive underframe is resiliently supported on a lateral motion bolster and swivels about an axis at the center of the truck, with means for preventing load transference among the axles.

Description of the prior art

In conventional motor trucks of the type in which the body is pivotally supported by a center plate on a laterally movable bolster carried by springs supported from the truck frame, tractive forces are transmitted from the truck frame to the body through the center plate, which is necessarily at a higher level than the axles to clear the motor. Since tractive force is applied to the truck frame through the axles, there is a tendency of the truck frame to tilt longitudinally about the center plate as a fulcrum, with resultant unloading of the axle or axles forward of the center plate and overloading of the axle or axles rearward of the center plate.

Summary of the invention

The invention provides a swivel center generally at the center of a six-wheel motor truck at a high level to clear the middle axle motor. In order to oppose longitudinal tilting of the truck frame, which the resilient support of the underframe thereon would otherwise allow, and consequent load transference, the truck frame is formed, at a level substantially lower than the bolster, e.g., at axle level but longitudinally offset from the middle axle, with means for pivotally and laterally movably but longitudinally fixedly receiving an element rigidly depending from the underframe.

Description of the preferred embodiment

Figures 1, 2, 3, 4:
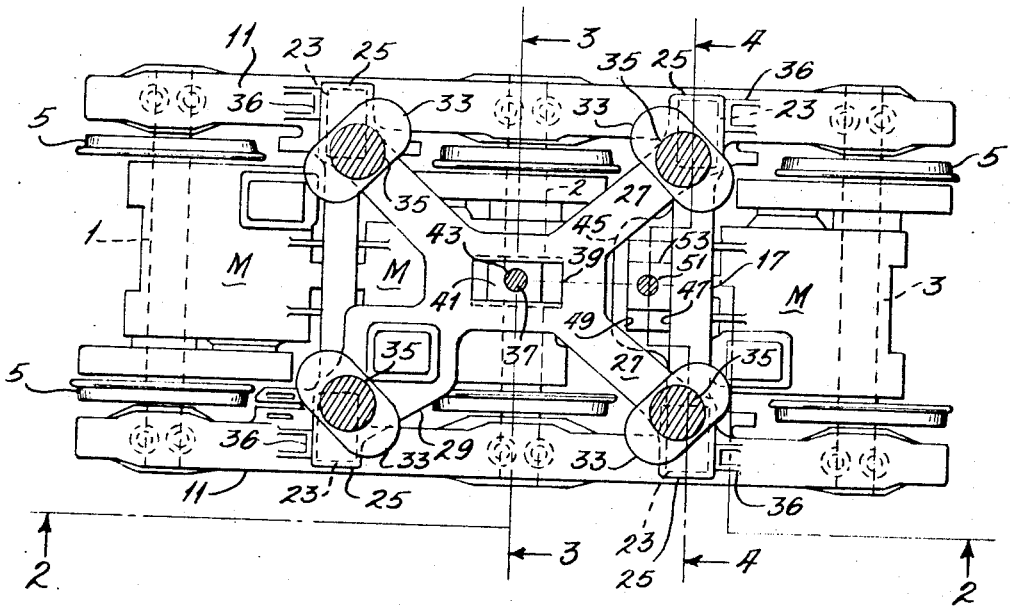
FIG. 1 is a plan view of a truck embodying the invention, taken along line 1—1 of FIG. 2.
FIG. 2 is a side elevational view partially sectionalized along line 2—2 of FIG. 1.
FIG. 3 is a transverse vertical sectional view along line 3—3 of FIG. 1.
FIG. 4 is a transverse vertical sectional view along line 4—4 of FIG. 1.

The truck comprises three spaced axles 1, 2 and 3, each rigidly mounting a pair of transversely spaced flanged wheels 5. Journal boxes 7 are rotatably mounted on the ends of each axle and are vertically slidably received in jaws formed between pedestal legs 9 of transversely spaced longitudinally extending truck frame side members 11. Coil springs 13 supported on boxes 7 extend upwardly into pockets in side members 11 whereby to resiliently support the truck side members 11 on the axles. Between end axle 1 and middle axle 2, and between middle axle 2 and end axle 3, side members 11 are rigidly connected by transverse transom members 15 and 17 respectively.

Transoms 15 and 17 are of box section, and the former is provided with a pair of vertically spaced sets of motor support brackets 19, 21 facing in opposite directions lengthwise of the truck and resiliently supporting the noses of two motors M associated, respectively, with axles 1 and 2. Transom 17 is provided with a single set of brackets 19, 21 facing end axle 3 and resiliently supporting motor M thereof.

At the intersections of frame side members 11 and transoms 15 and 17, the frame supports upright vertically and transversely resilient sandwiches each comprising a plurality of elastomeric pads 23 interleaved with metal plates, and these sandwiches in turn underlyingly support the extremities of diagonally extending legs 27, 27, 27 and 29 of a bolster having a central portion 31 elongated lengthwise of the truck. Adjacent their extremities 25, bolster legs 27, 27, 27, 29 are formed with upwardly facing horizontal bearing surfaces 33 elongated normal to radii from the center of the truck, and underframe U is formed with four rigidly depending feet 35 horizontally slidably seated on bearing surfaces 33 to accommodate swivel of the truck about its vertical central axis relative to the underframe U. The bolster is held against movement lengthwise of the truck by upstanding abutments 36 which vertically and laterally slidably engage the outer transverse surfaces of bolster leg extremities 25.

To provide a swivel center for the truck at substantially the truck center, underframe U is formed with a rigid depending vertical cylindrical post 37, normally coaxial with the vertical center line of the truck, and the elongated central portion 31 of the truck bolster is formed with an elongated rectangular aperture 39 in which is slidably mounted a block 41 for movement lengthwise of the truck only. Block 41 is formed with a central vertical cylindrical aperture 43 which receives and forms a pivotal bearing for underframe depending post 37.

The bolster, block 41 and the lower end of post 37 are at a high level, to clear the middle axle motor M and since body load is carried on bearings 33 at the corners of the bolster, the central portion of the bolster can be of substantially shallow depth, thus increasing the motor clearance without increasing the height of the underframe supports. Since block 41 is movable longitudinally of the bolster, no longitudinal forces are transmitted from the truck to the underframe at this high level.

For transmitting longitudinal (tractive and braking) forces from the truck to the underframe at axle level, and thus substantially reduce load transference from axle to axle, transom 17 is formed with a projection 45 extending toward middle axle 2, and containing an upwardly open aperture defined by longitudinally spaced transverse vertical webs 47 and 49 of transom 17 and projection 45 respectively, and longitudinal vertical webs 49 of projection 45. A second cylindrical post 51 depends rigidly from the underframe U and pivotally mounts, at its lower extremity at axle level, a block 53, slidably received between and in engagement with transverse vertical webs 47 and 49, for movement transversely of the truck to accommodate swivel of the truck about post 37 and lateral movement of the bolster and underframe, and for movement vertically to accommodate vertical movement of the underframe and bolster on elastomeric pads 23.

The details of the structure described herein may be varied without departing from the spirit of the invention and the exclusive use of such modifications is contemplated.

I claim:

1. A railway truck having three wheeled axles spaced apart longitudinally of the truck, a rigid frame supported on said axles and having a transverse transom between the middle axle and one end axle, resilient means supported on the sides of said frame intermediate the middle axle and both end axles, a bolster supported on said resilient means and having upwardly facing bearing surface above said resilient means for horizontally slidable load supporting engagement with downwardly facing bearing surfaces on a locomotive underframe, said bolster being formed with an aperture at its center, a block mounted in said aperture for movement therein solely longitudinally of the truck, said block being vertically cylindrically apertured to pivotally receive a cylindrical element depending from the underframe, an aperture in said transom, a second block mounted in said transom aperture at a level substantially lower than said bolster for movement solely transversely of the truck said second block being vertically cylindrically apertured to receive a second cylindrical element rigidily depending from said underframe for transmitting tractive and braking forces directly from said truck frame to the underframe at axle level.

2. A railway truck according to claim 1 in which said resilient means are yieldable vertically and transversely of the truck.

3. A railway truck according to claim 2 in which said resilient means comprise pads of elastomeric material.

4. A railway truck according to claim 1 in which the end of said bolster near said transom is formed with an indentation extending longitudinally of the truck toward the truck center to eliminate possible contact between said second cylindrical element and said bolster.

5. A railway truck according to claim 4 wherein said bolster has four legs extending diagonally from its center, the legs adjacent said transom forming between them said indentation.

6. A railway truck according to claim 5 wherein said resilient means underlie the extremities of said legs.

7. A railway truck according to claim 6 wherein said upwardly facing bearing surfaces are formed on the extremities of said legs.

8. A railway truck according to claim 1 in which said frame includes a second transverse transom between the middle axle and the other end axle and said middle axle mounts a traction motor projecting therefrom toward said second transom and supported thereon, said first-named transom having a portion projecting longitiudinally of the truck into the space between it and the middle axle unoccupied by said motor.

9. A railway truck according to claim 8 wherein said resilient means are seated on the upper surface of said frame at the intersections of both said transom and said frame side members.

10. A railway truck according to claim 8 wherein each end axle mounts a traction motor, said end axle traction motors both projecting from the end axles toward said transoms and having portions supported thereon.

11. A railway truck according to claim 1 in which there are two of said resilient means between the middle axle and each end axle, said resilient means being spaced apart transversely of the truck, there being also four of said upwardly facing bearing surfaces on said bolster in substantial vertical alignment with said resilient means.

12. A railway truck according to claim 1 wherein the frame is spring supported directly on the ends of all of said axles.

13. A railway locomtive comprising a truck having three transverse wheeled axles spaced apart longitudinally thereof, a rigid frame resiliently supported on said axles and comprising transversely spaced longitudinally extending side members and a transverse transom, resilient means supported on the sides of said frame between the middle axle and both end axles, a bolster supported on said resilient means and having upwardly facing bearing surfaces above said resilient means, said bolster also having an aperture at its center elongated longitudinally of the truck, said transom being formed with an aperture substantially at axle level and elongated transversely of the truck, an underframe having downwardly facing bearing surfaces in slidable engagement with said bolster upwardly facing surfaces and a first rigidly depending cylindrical element extending into said bolster aperture and pivotal and movable longitudinally of the truck but restrained against transverse movement therein, and a second rigidly depending cylindrical element extending into said transom aperture at a lower level than said bolster and pivotally and transversely movable but restrained against longitudinal movement therein.

References Cited

UNITED STATES PATENTS

| 844,151 | 2/1907 | Lindenthal | 105—199 |
| 1,544,125 | 6/1925 | Bell | 105—199 |
| 2,499,087 | 2/1950 | Bourdor | 105—199 |
| 2,632,405 | 3/1953 | Ivatt | 105—199 XR |
| 2,705,924 | 4/1955 | Travilla et al. | 105—199 XR |
| 2,925,789 | 2/1960 | Wintemberg | 105—199 XR |

ARTHUR L. LA POINT, *Primary Examiner.*

H. BELTRAN, *Assistant Examiner.*

U.S. Cl. X.R.

105—175, 189, 196, 199